United States Patent [19]
Yoshioka et al.

[11] 3,879,451
[45] Apr. 22, 1975

[54] PROCESS FOR THE PRODUCTION OF (PLUS)-CIS-, (PLUS)-TRANS-MIXED CHRYSANTHEMIC ACID

[75] Inventors: Hirosuke Yoshioka, Ikeda; Hajime Hirai, Tokyo; Akira Toyoura, Nishinomiya, all of Japan; Kenzo Ueda, Berkeley, Calif.

[73] Assignee: Sumitomo Chemical Company, Limited, Osaka, Japan

[22] Filed: Oct. 17, 1972

[21] Appl. No.: 298,247

[30] Foreign Application Priority Data
Oct. 19, 1971 Japan.............................. 46-83120

[52] U.S. Cl. ......... 260/514 H; 260/468 H; 424/306
[51] Int. Cl. ............................................. C07c 51/42
[58] Field of Search ...... 260/514 H, 468 H, 468 CA

[56] References Cited
UNITED STATES PATENTS
3,739,019  6/1973  Veda.................................. 260/514
FOREIGN PATENTS OR APPLICATIONS
2,043,173  4/1971  Germany ............................ 260/514

OTHER PUBLICATIONS
Eliel, Sterochemistry of Carbon Compounds, pp. 49–53 (1962).

Primary Examiner—Robert Gerstl
Attorney, Agent, or Firm—Stevens, Davis, Miller & Mosher

[57] ABSTRACT

An optical resolution process for preparation of optically active (+)-cis-, (+)-trans-mixed chrysanthemic acid which comprises resolving a mixture of (±)-cis- and (±)-trans-chrysanthemic acids by using as a resolution agent an optically active organic amine having the formula,

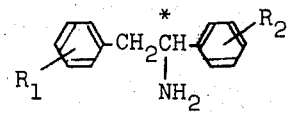

wherein $R_1$ and $R_2$ are individually a hydrogen atom or a lower alkyl.

4 Claims, No Drawings

PROCESS FOR THE PRODUCTION OF (PLUS)-CIS-, (PLUS)-TRANS-MIXED CHRYSANTHEMIC ACID

This invention relates to a process for preparation of (+)-cis-, (+)-trans-mixed chrysanthemic acid. More particularly, the invention pertains to a process for preparing (+)-cis, (+)-trans-mixed chrysanthemic acid with commerical advantages by subjecting a mixture of (±)-cis- and (±)-trans-chrysanthemic acids to optical resolution using as a resolution agent optically active organic amine represented by the formula (I),

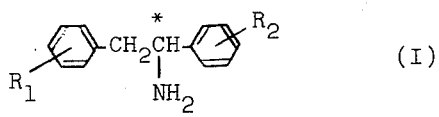

wherein $R_1$ and $R_2$ are individually a hydrogen atom or a lower alkyl.

Heretofore, the optical resolution of chrysanthemic acids has chiefly been carried out according to any of processes in which (±)-trans- and (±)-cis-chrysanthemic acids are individually treated with an optically active amine to obtain optically active forms of the respective acids, as disclosed in the following referential literature materials:

1. Campbell and Harper: Journal of the Science of Food and Agriculture, 3, 189, (1952)
2. French Patent No. 1,536,458
3. Japanese Patent Publication No. 20,382/71
4. Japanese Patent Publication No. 30,832/71

On the other hand, chrysanthemic acid which is most economically produced is a mixture of (±)-cis- and (±)-trans-chrysanthemic acids which can not be easily separated from each other. Some esters of (±)-cis-chrysanthemic acid with specific alcohols can be used as insecticides which are less toxic to mammmals and more active in knock-down effect than the corresponding esters of (+)-trans-chrysanthemic acid.

Moreover, in specific examples a mixture which consists of specific alcohol esters of (+)-cis-chrysanthemic acid and (+)-trans-chrysanthemic acid exhibits more potensive insecticidal activities than those of the corresponding ester of (+)-trans-chrysanthemic acid or (+)-cis-chrysanthemic acid.

Accordingly, the present process for production of the mixture of (+)-cis-chrysanthemic acid and (+)-trans-chrysanthemic acid from the mixture of (±)-cis- and (±)-trans-chrysanthemic acids is highly valuable from industrial point of view. However, there has been no precedent art which is capable of successfully dealing with this problems. For instance, in the example which is described in the referential literature (2), (±)-cis- and (±)-trans-chrysanthemic acid (cis - trans ratio is 3 : 7) is subjected to the optical resolution with D(—)-threo 1-p-nitro-phenyl-2-dimethylamino-1,3-propanediol and only (+)-trans-chrysanthemic acid is obtained, whereby no (+)-cis-chrysanthemic acid is found in the resolution product.

The present inventors have carried out a series of extensive studies on the process for obtaining the mixture of (+)-cis- and (+)-trans-chrysanthemic acid, in which a number of available optically active amines were attempted for this purpose. Among them the aforesaid amines, in particular, (+)-1-phenyl-2-p-tolyl-ethylamine which is used in the resolution process of (±)-trans-chrysanthemic acid to obtain the (+)-trans isomer in the referential literature (3) were found to be unique in that the amines could solve the subject problem with the following satisfactory results: when a mixture comprising (±)-cis- and (±)-trans-chrysanthemic acids in a ratio within a specific range is subjected to optical resolution with one of the aforesaid amines, there are obtained as precipitation a salt consisting of (+)-cis- and (+)-trans chrysanthemic acids and the amine, and under proper conditions cis-trans ratios of the (+)-acids are essentially equal to the ratios in the (±)-acids which are submitted to the optical resolution.

More beneficially, the emphasis is put forth that the (+)-cis- and (+)-trans-chrysanthemic acids which are obtained after single resolution procedure are often highly pure in optical grades so that these require no further purification. These advantages are good enough to develop the resolution method of the present invention into industrial process with a great deal of economical merits and enable to have the mixture of (+)-cis- and (+)-trans-chrysanthemic acids first industrially available.

The optically active organic amine having the formula (I) is conveniently prepared in the following manners: Friedel-Crafts acylation of benzene gives the corresponding benzyl-phenylketone, which is converted to the amine by the Leuckart reaction. The racemic amine thus obtained is resolved with aspartic acid to afford the optically active amine.

Examples of the amine used in the present invention include (+)-α-phenyl-β-p-tolyl-ethylamine, (+)-α-p-tolyl-β-phenyl-ethylamine and (+)-α-phenyl-β-phenyl-ethylamine.

It becomes effective to carry out the optical resolution of the mixture comprising (±)-cis- and (±)-trans-chrysanthemic acids when the content of (±)-cis-chrysanthemic acid is not less than 3% by weight and, as a rule, it is effectively carried out when the content of (±)-cis-chrysanthemic acid is 10 to 30% by weight and a suitable organic solvent such as, for example, an alcohol such as methanol, ethanol, propanol or isopropanol; a ketone such as acetone or methyl ethyl ketone; an ether such as tetrahydrofuran or dioxane, dimethylformamide, dimethylsulfoxide, a mixture thereof, or an aqueous mixture thereof.

In carrying out the present process, (±)-cis- and (±)-trans-chrysanthemic acids and the aforesaid amine are dissolved respectively in the aforesaid solvent according to the conventional procedure, for example, by heating, and the resulting solutions are mixed each other. The crystallization of the amine salts may be conducted by the conventional manner, for example, by utilizing the differences of the dissolving temperature and the crystallization temperature, or by using a solvent, which is different from the solvent used for dissolving them and which hardly dissolves the amine salts. The aforesaid amine may be used in an almost equimolar amount to the (±)-cis-, (±)-trans-chrysanthemic acids. The concentration of the (±)-cis-, (±)-trans-chrysanthemic acids in the solvent is 1 to 20% by weight, preferably about 10% by weight. The resulting amine salts may be decomposed according to the conventional procedure, for example, by adding an aqueous alkaline solution.

The process of the present invention is illustrated below with reference to examples, which are only illustrative, but not limitative.

EXAMPLE 1

Into a solution of 12.0 g of a 11:89 mixture of (±)-cis- and (±)-trans-chrysanthemic acids in 97 ml of 85% methanol was dropped at 45° to 50°C a solution of 11.31 g of (+)-α-phenyl-β-p-tolyl-ethylamine in 33 ml of 85% methanol, and a (+)-amine salt of (+)-trans acid was seeded into the mixed solution. Subsequently, the solution was cooled to 20°C over a period of about 2 hours, while stirring the system vigorously, and then stirred for 5 hours to deposit crystals of the resulting amine salt. The deposited crystals were recovered by filtration and dried, and then the salt was decomposed with 10% NaOH. Thereafter, free (+)-amine was removed by extraction with toluene, and the aqueous layer was acidified, extracted with petroleum benzine and then concentrated to obtain optically active chrysanthemic acid.

| | |
|---|---|
| Yield | 67% vs. (+)-chrysanthemic acid |
| Cis/trans ratio | 9.7/90.3 |
| $[\alpha]_D$ | +23.62° (CHCl$_3$) |
| Optical purity | 72% |

In the above, the recovered salt was purified according to ordinary recrystallization and then subjected to the above-mentioned isolation operation, whereby pure optically active chrysanthemic acid could be easily obtained.

EXAMPLE 2

12.0 Grams of a 15:85 mixture of (±)-cis- and (±)-trans-chrysanthemic acids was treated in the same manner as in Example 1, using 11.31 g of the same (+)-amine as in Example 1 and a total of 122 ml of 85% methanol, to obtain optically active chrysanthemic acid.

| | |
|---|---|
| Yield | 72% vs. (+)-chrysanthemic acid |
| Cis/trans ratio | 12.5/87.5 |
| $[\alpha]_D$ | +26.73° (CHCl$_3$) |
| Optical purity | 78% |

EXAMPLE 3

12.0 Grams of a 20:80 mixture of (±)-cis- and (±)-trans chrysanthemic acids was treated in the same manner as in Example 1, using 11.31 g of the same amine as in Example 1 and a total of 122 ml of 85% methanol, to obtain optically active chrysanthemic acid.

| | |
|---|---|
| Yield | 68.2% vs. (+)-chrysanthemic acid |
| Cis/trans ratio | 18.0/82.0 |
| $[\alpha]_D$ | +31.84° (CHCl$_3$) |
| Optical purity | 84.2% |

EXAMPLE 4

12.0 Grams of a 25:75 mixture of (±)-cis- and (±)-trans-chrysanthemic acids was treated in the same manner as in Example 1, using 11.31 g of the same (+)-amine as in Example 1 and a total of 122 ml of 85% methanol, to obtain optically active chrysanthemic acid.

| | |
|---|---|
| Yield | 68.2% vs. (+)-chrysanthemic acid |
| Cis/trans ratio | 25.9/74.1 |
| $[\alpha]_D$ | +35.86° (CHCl$_3$) |
| Optical purity | 84.1% |

EXAMPLE 5

12.0 Grams of a 5:95 mixture of (±)-cis- and (±)-trans-chrysanthemic acids was treated in the same manner as in Example 1, using 11.31 g of the same (+)-amine as in Example 1 and a total of 108.5 ml of 85% methanol to obtain optically active chrysanthemic acid.

| | |
|---|---|
| Yield | 96% vs. (+)-chrysanthemic acid |
| Cis/trans ratio | 2.7/97.3 |
| $[\alpha]_D$ | +9.18° (CHCl$_3$) |
| Optical purity | 32.3% |

EXAMPLE 6

12.0 Grams of a 20:80 mixture of (±)-cis- and (±)-trans-chrysanthemic acids was treated in the same manner as in Example 1, using 11.31 g of the same (+)-amine as in Example 1 and a total of 111 ml of 85% methanol. The deposited crystals were washed with cold 80% methanol to obtain after the working-up described in Example 1 optically active chrysanthemic acid.

| | |
|---|---|
| Yield | 66% vs. (+)-chrysanthemic acid |
| Cis/trans ratio | 17.3/82.7 |
| $[\alpha]_D^{24}$ | +36.05° (CHCl$_3$) |
| Optical purity | 96% |

What is claimed is:

1. A process for the preparation of a mixture of (+)-cis- and (+)-trans-chrysanthemic acids which comprises mixing a mixture of (±)-cis- and (±)-trans-chrysanthemic acids in an organic solvent selected from the group consisting of methanol, ethanol, propanol, isopropanol, acetone, methyl ethyl ketone, tetrahydrofuran, dioxane, dimethylformamide, dimethylsulfoxide, a mixture thereof and an aqueous mixture thereof, with a dextrorotatory organic amine having the formula,

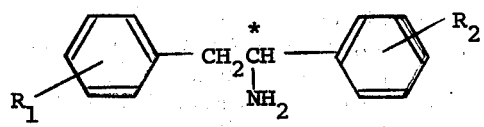

wherein $R_1$ and $R_2$ are a hydrogen atom or a lower alkyl, crystallizing in a conventional manner the resulting mixture to form the amine salts of (+)-cis- and (+)-trans-chrysanthemic acids, and recovering a mixture of (+)-cis- and (+)-trans-chrysanthemic acids.

2. A process according to claim 1, wherein the content of (±)-cis-chrysanthemic acid in the mixture of (±)-cis- and (±)-trans-chrysanthemic acids is 10 to 30% by weight.

3. A process according to claim 1, wherein the dextrorotatory organic amine is selected from the group consisting of (+)-α-phenyl-β-p-tolyl-ethylamine, (+)-α-p-tolyl-β-phenyl-ethylamine and (+)-α-phenyl-β-phenyl-ethylamine.

4. The mixture of (+)-cis- and (+)-trans-chrysanthemic acids obtained according to claim 2.

* * * * *